UNITED STATES PATENT OFFICE.

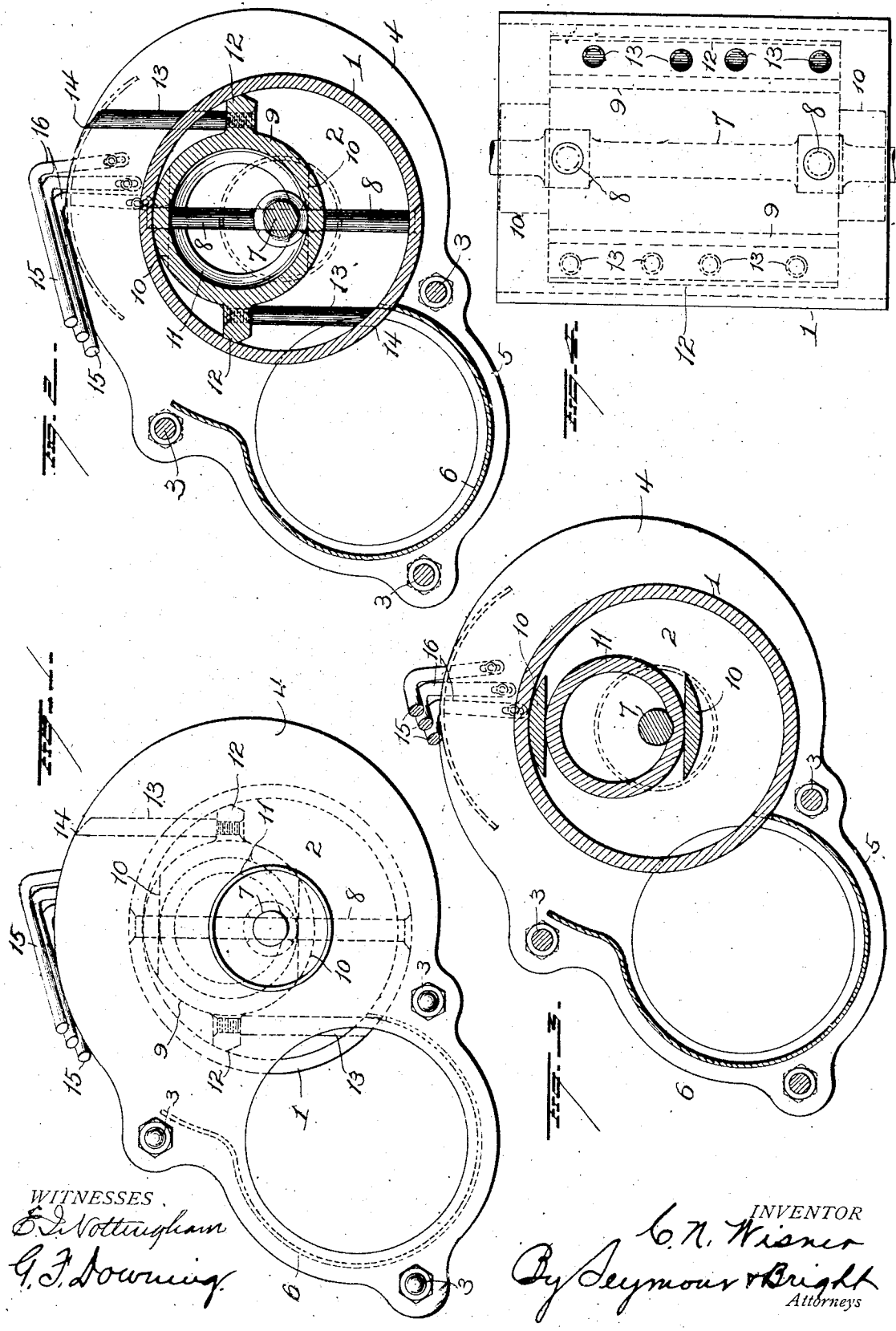

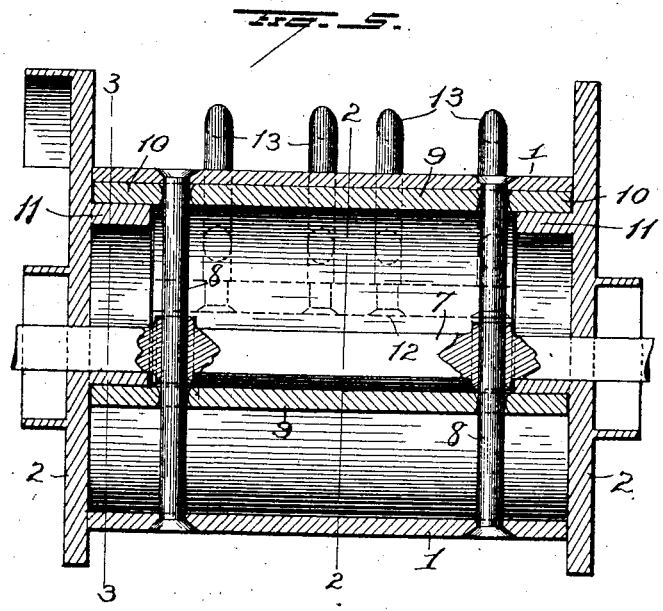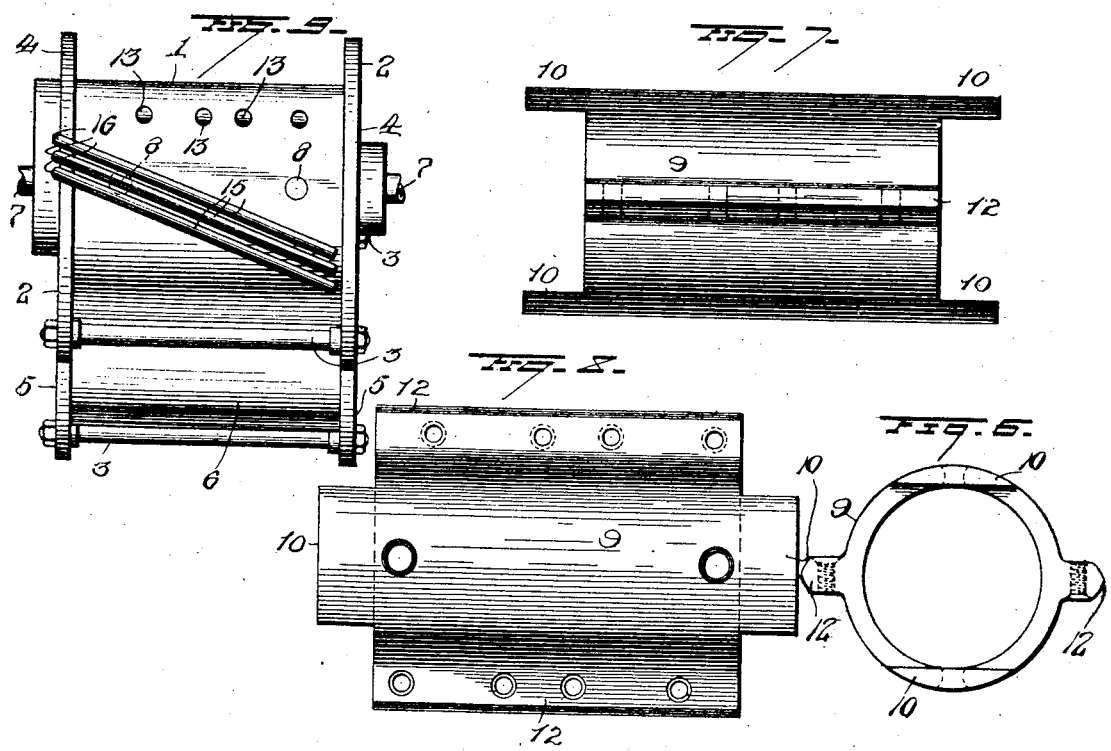

CLARK NOBLE WISNER, OF NEW ORLEANS, LOUISIANA, ASSIGNOR TO C. N. WISNER COTTON PICKER COMPANY, INCORPORATED, OF NEW ORLEANS, LOUISIANA.

COTTON-PICKER.

1,329,067.   Specification of Letters Patent.   Patented Jan. 27, 1920.

Application filed August 8, 1917. Serial No. 185,102.

*To all whom it may concern:*

Be it known that I, CLARK N. WISNER, a citizen of the United States, and a resident of New Orleans, in the county of Orleans and State of Louisiana, have invented certain new and useful Improvements in Cotton-Pickers; and I do hereby declare the following to be a full, clear, and exact description of the invention, such as will enable others skilled in the art to which it appertains to make and use the same.

This invention relates to improvements in cotton pickers and more particularly to an improved picker head, and more particularly to the general type shown in Patent No. 1,182,518 granted to me May 9th, 1916, the object of the invention being to so construct a picker head as to enhance its efficiency in picking the cotton from the bolls; to so construct and dispose the picker pins with relation to the cylinder of the head, that said pins will, when projected bear such tangential relation to the cylinder as to form hooks; and to provide simple and efficient means for projecting and withdrawing the picker pins.

With this and other objects in view the invention consists in certain novel features of construction and combinations of parts as hereinafter set forth and pointed out in the claims.

In the accompanying drawings, Figure 1 is an end view of a picker head embodying my improvements. Fig. 2 is a transverse sectional view on the line 2—2 of Fig. 5. Fig. 3 is a transverse sectional view on the line 3—3 of Fig. 5. Fig. 4 is a plan view. Fig. 5 is a longitudinal sectional view. Figs. 6, 7 and 8 are details views of the pin carrier and Fig. 9 is a plan view of the device.

The picker head comprises in its structure, a cylindrical rotatable body portion 1 and heads 2—2 at respective ends thereof, said heads being held in place by means of suitable rods 3. The heads 2 are made appreciably greater in width than the diameter of the cylinder and form flanges 4 at respective ends of the latter. The heads 2 are provided with extensions 5 and receive a tube 6 into which cotton from the picking devices will be deposited and from which said cotton will be conveyed by pneumatic or other suitable means.

An operating shaft 7 passes through the cylinder 1 and its head 2 and extending transversely through the cylinder and rigid with the shaft 7 are rods 8,—said rods 8 being rigidly secured at their ends to the cylinder and they serve as guides for a frame or carrier 9 which is movable transversely within said cylinder.

The frame or carrier 9 may be cylindrical in form and is provided at its respective ends with lugs or projections 10. The lugs or projections 10 at each end of the carrier receive between them an annular member or flange 11 projecting inwardly from the respective heads 2 and so disposed as to be eccentric to the axis of the shaft 7. The annular members or flanges 11 thus constitute cams or eccentrics which will, when the shaft 7 and cylinder 1 are rotated, cause the carrier to reciprocate within said cylinder. The carrier 9 is provided at diametrically opposite sides with lateral flanges 12 to which the inner ends of picker pins 13 are secured. Two sets of picker pins are thus provided and are disposed in parallel planes and in planes parallel with those of the rods 8. The pins of one set project in an opposite direction to the pins of the other set and all of said pins project and are freely movable through holes in the wall of the cylinder 1. When the pins are projected during the reciprocations of the carrier 9 they will become disposed tangentially to the cylinder and will thus form hooks which will engage the cotton and pull the same from the bolls. To facilitate and render more positive the engagement of the pins with the cotton, the free ends of said pins are beveled to form comparatively sharp engaging points or ends 14.

In order to further facilitate the removal of the cotton from the bolls it is important to prevent the bolls from being driven aside by the pins and for this purpose I provide a plurality of fingers 15 which form abutments to engage the boll and hold the same sufficiently to insure the proper picking of the cotton by the pins. These fingers may be provided with arms 16 having pin and slot or other adjustable connection with one of the heads 2 as shown in Fig. 2.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent is:

1. In a picker head, the combination with a rotary cylinder, heads thereon, and a shaft passing through said cylinder and heads, of a pin carrier to reciprocate transversely within said cylinder, pins attached to said carrier and passing freely through the walls of the cylinder so as to be disposed substantially tangentially with relation thereto when projected, and form hooks, and means for causing said carrier to reciprocate transversely of said cylinder.

2. In a picker head, the combination with a rotary cylinder, and heads thereon, of a pin carrier mounted to reciprocate transversely within said cylinder, and sets of pins secured to said reciprocating carrier and passing through the wall of the cylinder and adapted to project beyond the cylinder wall so as to be disposed substantially tangentially to the cylinder when projected.

3. In a picker head, the combination with a rotary cylinder provided at its ends with heads, of a reciprocating carrier mounted to reciprocate transversely within said cylinder, a set of picker pins secured at each side of said carrier, one set of said pins projecting in the opposite direction from that of the other set, the two sets being disposed in parallel planes and adapted to project in opposite directions through and beyond the wall of the cylinder and be disposed substantially tangentially to the latter, and means for causing said carrier to reciprocate within the cylinder.

4. In a picker head, the combination with a rotary cylinder, of a carrier mounted to reciprocate transversely therein, picker pins secured to said carrier and projecting freely through the wall of the cylinder so as to be disposed substantially tangentially to the latter, said pins having beveled free ends, and means for reciprocating said carrier transversely within the cylinder.

5. In a picker head, the combination with a cylinder and heads thereon, of a carrier mounted to reciprocate within said cylinder, pairs of lugs at respective ends of the carrier, cams on the heads to be engaged by said lugs whereby said carrier will be reciprocated when the cylinder is turned, and pins secured to said carrier and projecting through the wall of the cylinder.

6. In a picker head, the combination with a rotary cylinder and its heads, of a pin carrier mounted to reciprocate in said cylinder, pins secured to said carrier and passing through the wall of the cylinder so as to be disposed substantially tangentially to the latter, and abutment fingers disposed in front of said cylinder and adjustably attached to one of the heads thereof.

In testimony whereof, I have signed this specification in the presence of two subscribing witnesses.

CLARK NOBLE WISNER.

Witnesses:
 FRANK KLEINSCHMIDT,
 HENRY F. HAMMETT.